April 23, 1968     G. K. UJHELYI ETAL     3,379,486

PLURAL INTERNAL REFLECTION POLARIZED LIGHT MODULATOR

Filed April 23, 1964

INVENTORS
Gabor K. Ujhelyi
Sergio T. Ribeiro
By Richard J. Miller
Atty.

United States Patent Office 3,379,486
Patented Apr. 23, 1968

3,379,486
PLURAL INTERNAL REFLECTION POLARIZED LIGHT MODULATOR
Gabor Kalman Ujhelyi and Sergio Telles Ribeiro, Urbana, Ill., assignors, by mesne assignments, to the United States of America as represented by the Secretary of the Navy
Filed Apr. 23, 1964, Ser. No. 362,214
4 Claims. (Cl. 350—150)

ABSTRACT OF THE DISCLOSURE

This invention relates to a light modulator wherein there is provided a light path in a glass medium having plane parallel internal reflecting surfaces, including a birefringent material adjacent said internally reflective surfaces and electrodes in said birefringent material to vary the index of refraction in response to the voltage applied to the electrodes thereby causing a light beam which has been passed through a light polarizer to be modulated.

---

This invention relates to an electromagnetic wave modulator and more specifically to an apparatus for the modulation of electromagnetic wave energy in the optical spectrum.

With the recent advent of the masers and lasers it has been found that old methods of control of modulation of electromagnetic energy at optical frequencies are not adequate. New methods and apparatus must be developed to adequately control such light propagation.

It is therefore, an object of this invention to provide a new means for modulation of electromagnetic radiation in the optical spectrum.

It is a further object of this invention to provide a light modulator which has an extremely fast operating characteristic.

It is yet another object of this invention to provide an apparatus which contains a path for multiple reflections from internal reflecting surfaces which may be varied by control of electromagnuetic properties of a surrounding media.

It is still a further object of this invention to provide a light modulator, comprising a first medium transparent to a given band of electromagnetic radiation, a second medium having an interface with the first medium and having a variable index of refraction, a pair of electrodes spaced from each other in the second medium adjacent the interface, means for directing a light beam through the first medium incident to said interface at a given angle, and means for applying a voltage between the electrodes to change the index of refraction to vary the reflective and refractive properties of the interface.

It is yet a further object of this invention to provide a light modulator wherein a light beam is controlled by reflecting it from an interface between an internal reflecting surface and a birefringent material having a pair of electrodes adjacent said interface across which a control signal is impressed.

Figure 1:
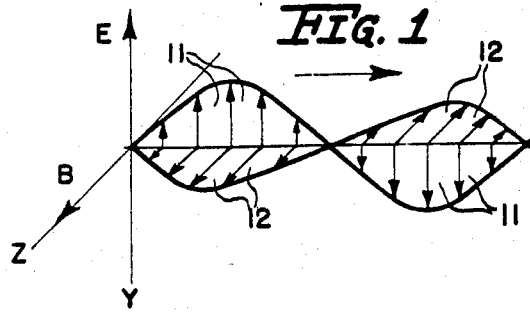
Figure 2:
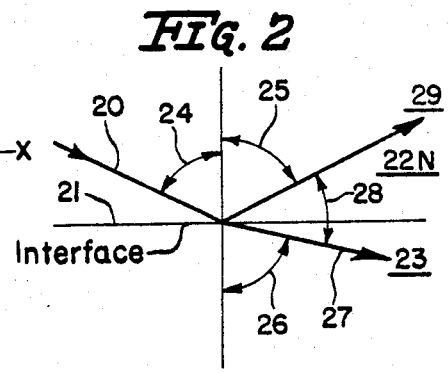
Figure 3:
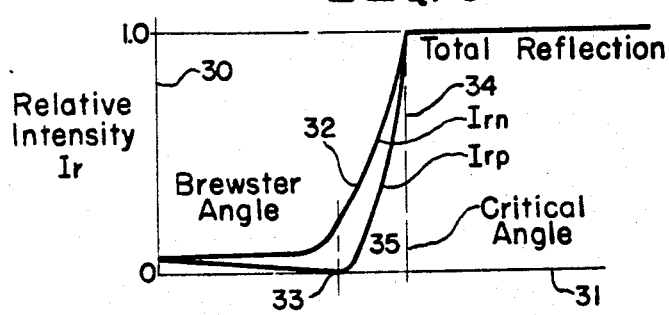
Figure 4:
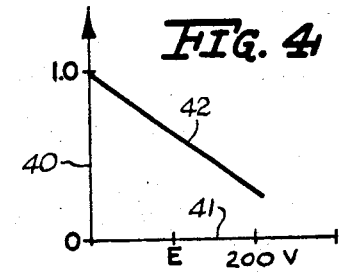
Figure 5:
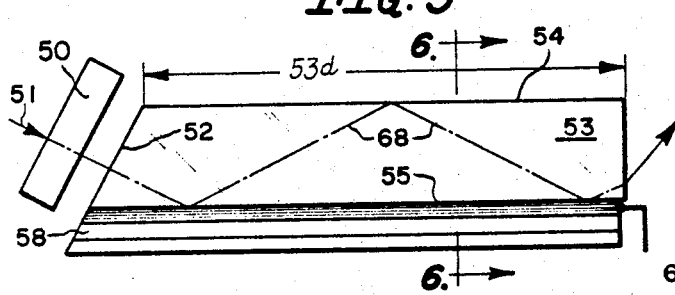
Figure 6:
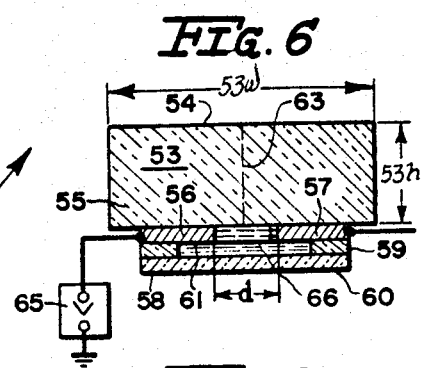
Figure 7:
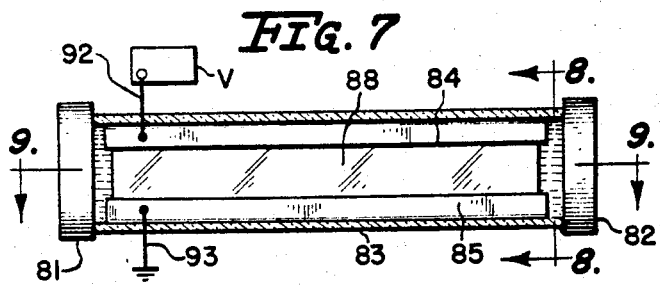
Figure 8:
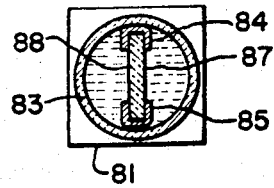
Figure 9:
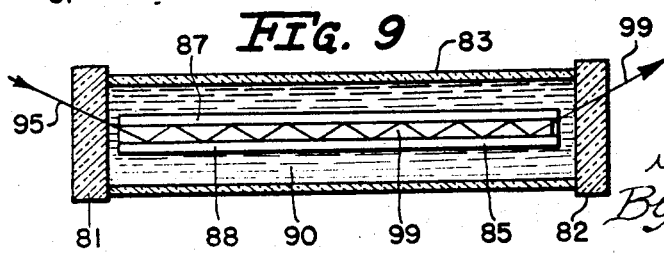

Other objects, advantages and novely features of the invention will become apparent from the following detailed description of the invention when considered in conjunction with the accompanying drawings wherein:

FIGURE 1 is a diagrammatical representation of the spatial electric and magnetic variation in a light wave;
FIGURE 2 shows the relationship at an interface between the angles of incidence, reflection and refraction;
FIGURE 3 is a graph showing relative light intensity versus incidence angle;
FIGURE 4 is a graph of relative intensity versus electrode voltage;
FIGURE 5 is a side view of one embodiment of the invention;
FIGURE 6 is a sectional view along line 6—6 in FIGURE 5;
FIGURE 7 is a second embodiment of the invention;
FIGURE 8 is a sectional view along line 8—8 in FIGURE 7; and
FIGURE 9 is a sectional view along line 9—9 in FIGURE 7.

FIGURE 1 shows a plane polarized light wave traveling in the X-direction. The wave form delineated in the X–Y plane by vectors 11 correspond with periodic electric vibrations along the Y-axis, and that delineated in the X–Y plane by vectors 12 represent the accompanying magnetic periodic vibrations along the Z axis. The electric and magnetic vibrations are in mutually perpendicular planes both of which are transverse to the direction of wave propagation. The plane which contains the electric vector is called the plane vibration or plane of polarization.

FIGURE 2 shows an unpolarized incident light ray 20 intercepting an interface 21 between two media 22, 23, wherein the index of refraction of 22 is larger than the index of refraction of 23. Ray 20 is at an angle 24, the incident angle, and the reflected angle 25 is equal to angle 24. Angle of refraction 26 is given by Snell's law as:

$$\frac{\text{Sin (angle 24)}}{\text{Sin (angle 26)}} = \text{a constant}$$

When angle 28 is equal to 90 degrees the angle of incidence 24, is said to be at the Brewster angle, and ray 29 is maximally polarized in a plane parallel to the interface.

When the angle of incidence 24 in FIGURE 2 is greater than the critical angle and there is no refracted light beam, the entire ray 20 is totally reflected along the path 29.

Generally, the discussions of reflection and refraction indicate that one of these paths of propagation predominates. However, it is to be understood there is a finite area within which the ray of incident light 24 is partially refracted and partially reflected. This is more clearly shown in FIGURE 3 wherein the vertical axis 30 represents relative intensity of reflection and the horizontal axis 31 is the incident angle. Line 32, representing a ray polarized in a plane perpendicular to the interface, starts at some point about zero on vertical axis 30 and shows that there is some reflection even though the light beam were to enter the interface normally corresponding to an angle of incidence equal to zero. This reflection is substantially constant until some point is reached, designated by 33, which is the Brewster angle and rapidly increases to 100 percent reflection at an angle 34 called the critical angle. If the light ray is polarized parallel to the interface then there is a change in relative intensity of the reflected light as presented by the line 35 which starts at some point above zero on the vertical axis 30 and goes to zero at the Brewster angle, point 33, and then up to 100 percent reflection at critical angle 34.

An electro-optic effect discovered by Kerr, and bearing his name as the Kerr effect, states that optical index of refraction for light polarized in the direction of the optical axis of a birefringent medium is different from the index for light polarized perpendicular to that direction. In an electrically birefringent medium the optical axis is in the direction of the electric field. It is also known that the variation of the refractive index for a light beam polarized in the direction of the applied electric field is proportional to the square of this electric field intensity. The Kerr effect is utilized in this invention to vary the refractive index of a less dense medium, thus changing the ratio of indices of refractions, consequently varying the critical angle and thus controlling the amplitude of a reflected beam. This is accomplished by controlling a suitably orientated electric field parallel and adjacent to an interface between a dense and less dense medium.

FIGURE 4, a graphical presentation whose vertical axis 40 is in relative intensity and horizontal axis 41 is in volts, shows by a line 42 that there is a linear relationship over a portion of the curve between zero to two hundred volts.

FIGURE 5, one embodiment of the invention shows a parallel light beam 51 projected through a polarizer 50 in such a manner as to polarize the beam parallel to the internal surface 55 normal to the surface 52 and incident to an internal surface 55 of an optically transparent medium or member 53, at an angle greater than the critical angle. Member 53 would normally be glass. Hence, the beam 52 is reflected along a path 68 to be reflected from an internal surface 54 back to surface 55 and on out of member 53.

The end view, FIGURE 6, of member 53 shows a pair of electrodes 56, 57 spaced from each other and adjacent the internal reflecting surface 55. A pair of insulated spacers 58, 59 and a plate 60 define electrodes 56 and 57 and member 53 a volume which is filled with a birefringent liquid, in this instance nitrobenzene. The liquid in the volume has an interface along a portion of planar face 55 with the glass member 53. Light beam 51, directed through polarizer 50, is horizontally polarized, and is multiply reflected essentially in a plane shown in FIGURE 6 as a dashed line 63. Electrode 57, as shown in FIGURE 6, is grounded while electrode 56 is connected to a source of DC potential 65. When a voltage is applied by the source 65 to the electrodes an electrostatic field, as shown in simplified form by the dashed lines 66, exists in the nitrobenzene between the electrodes and parallel and adjacent to the interface with glass member 53. The angle selected for light beam 51 to intercept the interface 55 with the nitrobenzene in the glass member 53 is very close to the critical angle. Depending upon the initial conditions for the optical modulator the applied potential either conditions the interface to reflect or refract as the case might be. Assuming that the initial conditions are selected so that the beam is reflected then it will follow the path shown by line 68 in FIGURE 5 and by plane 63 in FIGURE 6 within the glass member 53. As the potential across the electrode gap spacing varies the light beam is refracted a certain portion as shown in FIGURE 3, in that there is some refraction at each point of interception of the light beam and the interface 55.

In this maner the intensity of the existing beam 68 is successively attenuated, having the effect of reducing the output beam intensity essentially to zero. By modulating the voltage source 65 it is thus possible to modulate the output beam intensity with any sort of signaling, communication or video intelligence.

FIGURES 7, 8 and 9 show a second embodiment of the invention which also has the ability to modulate a light beam from substantially zero to 100 percent. Included therein are end members 81, 82 confining therebetween a cylindrical housing member 83. A pair of U shaped electrodes 84, 85 confine between their respective arms a glass plate 86 having planar sides 87, 88. A birefringent liquid such as nitrobenzene or carbon bisulfide 90 fills the volume of member 83 not occupied by the glass plate and the electrodes. Potential may be applied to electrodes 84, 85 by leads 92, 93 establishing a potential adjacent the interface of the liquid 90 and the plate 86.

A light ray 95 is projected at an incident angle with planar face 88 and reflected towards planar face 87. A series of such reflections take place as designated by the line 99, and the beam passes beyond the modulator as shown. By varying the potential between the electrodes it is possible to vary the present reflection upon each such interception and the net result is that modulation of a light beam may be substantially total with this configuration.

As in the first embodiment, by modulating the voltage source 65 it is possible to modulate the output beam intensity with any sort of signaling, communication or video intelligence.

Obviously many modifications and variations of the present invention are possible in the light of the above teachings. It is therefore to be understood that within the scope of the appended claims the invention may be practiced otherwise than as specifically described.

We claim:
1. A light modulator, comprising:
 (a) a glass member transparent to a given band of electromagnetic radiation having first and second plane parallel, internal reflecting surfaces and two end surfaces;
 (b) a liquid, birefringent medium having a variable index of refraction and having an interface with each of said internal reflecting surfaces;
 (c) a pair of U shaped electrodes spaced from each other in said liquid medium adjacent to and encompassing portions of said internal reflecting surfaces;
 (d) a polarizer;
 (e) means, for directing a light beam through said polarizer and through one end of said member to a first of said internal reflecting surfaces at an angle causing said beam to be reflected from said first surface to said second surface; and
 (f) means, for applying a voltage between said electrodes to change said index of refraction of said birefringent liquid medium to vary the reflection and refraction properties at said surface with said internal reflecting surfaces to thereby modulate the light which exits from the other end of said glass member.

2. The modulator of claim 1 wherein said polarizer is oriented to cause the plane of polarization of said light beam to be normal to said internal reflecting surfaces.

3. The modulator of claim 2 wherein said light beam intercepts said internal reflecting surfaces at an angle approximately equal to the Brewster angle for the given glass composition.

4. The modulator of claim 3 wherein said glass member has such dimensions as to allow multipe reflections of said light beam between said internal reflecting surfaces.

References Cited
UNITED STATES PATENTS

| | | | |
|---|---|---|---|
| 3,158,746 | 11/1964 | Lehovec | 350—160 |
| 3,169,163 | 2/1965 | Nassenstein | 350—160 |
| 3,295,911 | 1/1967 | Ashkin et al. | 331—94.5 |
| 3,311,845 | 3/1967 | Koester | 331—94.5 |

JEWELL H. PEDERSEN, *Primary Examiner.*

RONALD L. WIBERT, *Examiner.*